(12) United States Patent
Ganjvar

(10) Patent No.: US 11,865,646 B2
(45) Date of Patent: Jan. 9, 2024

(54) TUBE TO TUBE SHEET WELDING FOR FABRICATION OF VERTICAL BOILING REACTOR WITH REDUCED TUBE PITCH

(71) Applicant: Scientific Design Company, Inc., Little Ferry, NJ (US)

(72) Inventor: Mohammad Ganjvar, Mahwah, NJ (US)

(73) Assignee: Scientific Design Company, Inc., Little Ferry, NJ (US)

( * ) Notice: Subject to any disclaimer, the term of this patent is extended or adjusted under 35 U.S.C. 154(b) by 57 days.

(21) Appl. No.: 17/575,023

(22) Filed: Jan. 13, 2022

(65) Prior Publication Data
US 2022/0226937 A1     Jul. 21, 2022

Related U.S. Application Data

(60) Provisional application No. 63/139,019, filed on Jan. 19, 2021.

(51) Int. Cl.
*B23K 33/00*     (2006.01)
*B01J 19/00*     (2006.01)
(Continued)

(52) U.S. Cl.
CPC ......... *B23K 33/006* (2013.01); *B01J 19/0053* (2013.01); *B01J 19/2415* (2013.01); *B01J 2219/00081* (2013.01); *B23K 2101/14* (2018.08)

(58) Field of Classification Search
CPC ......... B01J 8/00; B01J 8/02; B01J 8/06; B01J 8/067; B01J 19/00; B01J 19/0053;
(Continued)

(56) References Cited

U.S. PATENT DOCUMENTS 3,563,914 A    2/1971   Wattimena
3,702,259 A    11/1972   Nielsen
(Continued)

FOREIGN PATENT DOCUMENTS

| CN | 111203669 A | * | 5/2020 |
| EP | 2887001 A1 | | 6/2015 |
| WO | 2002063230 A1 | | 8/2002 |

OTHER PUBLICATIONS

Machine translation of CN 111203669 A, which was published May 29, 2020 (Year: 2020).*

(Continued)

*Primary Examiner* — Natasha E Young
(74) *Attorney, Agent, or Firm* — Scully, Scott, Murphy & Presser, P.C.

(57) ABSTRACT

Reduced tube pitch within a shell-and-tube heat exchange reactor such as, for example, an EO reactor, is provided by utilizing a welding material that has a high tensile (i.e., a tensile strength of greater than 600 MPa). Reduced tube pitch allows for more elongated tubes (the tubes are filled with a catalyst) to be present in a reactor, and thus a smaller reactor can be manufactured. Notably, the use of a high tensile strength welding material allows the implementation of a small welding groove located between a beveled sidewall of a beveled upper portion of an opening provided in a tube sheet overlay material (that is located atop a tube sheet) and an outermost sidewall of the elongated tube passing through the opening in the tube sheet overlay material.

21 Claims, 3 Drawing Sheets

(51) Int. Cl.
*B01J 19/24* (2006.01)
*B23K 101/14* (2006.01)

(58) Field of Classification Search
CPC .... B01J 19/24; B01J 19/2415; B01J 2208/00; B01J 2208/00008; B01J 2208/00017; B01J 2208/00106; B01J 2208/00168; B01J 2208/00212; B01J 2208/0053; B01J 2219/00; B01J 2219/00049; B01J 2219/00051; B01J 2219/00074; B01J 2219/00076; B01J 2219/00081; B23K 9/00; B23K 9/02; B23K 9/028; B23K 9/0288; B23K 33/00; B23K 33/004; B23K 33/006; B23K 2101/00; B23K 2101/04; B23K 2101/14

See application file for complete search history.

(56) References Cited

U.S. PATENT DOCUMENTS

| | | | |
|---|---|---|---|
| 4,579,171 A * | 4/1986 | Stafford | F28F 9/182 228/183 |
| 4,761,394 A * | 8/1988 | Lauritzen | B01J 23/688 502/348 |
| 4,766,105 A | 8/1988 | Lauritzen | |
| 4,908,343 A | 3/1990 | Bhasin | |
| 5,011,807 A | 4/1991 | Hayden et al. | |
| 5,057,481 A | 10/1991 | Bhasin | |
| 5,099,041 A | 3/1992 | Hayden et al. | |
| 5,102,848 A | 4/1992 | Soo et al. | |
| 5,145,824 A * | 9/1992 | Buffum | B01J 23/688 502/216 |
| 5,187,140 A | 2/1993 | Thorsteinson et al. | |
| 5,407,888 A | 4/1995 | Herzog et al. | |
| 7,700,791 B2 * | 4/2010 | Billig | B01J 8/0496 549/534 |
| 8,034,308 B2 | 10/2011 | Chiu et al. | |
| 2003/0192680 A1 | 10/2003 | Blanda, Jr. et al. | |
| 2007/0037991 A1 | 2/2007 | Rizkalla | |

OTHER PUBLICATIONS

Pinnacle Alloys—ERNiCr-3 Data Sheet (Year: 2008).*
Pinnacle Alloys ERNiCrMo-3 (Year: 2008).*
Markforged Inconel 625 Material Datasheet (Year: 2019).*
International Search Report dated Apr. 28, 2022, received in a corresponding foreign application, 9 pages.

* cited by examiner

TUBE TO TUBE SHEET WELDING FOR FABRICATION OF VERTICAL BOILING REACTOR WITH REDUCED TUBE PITCH

CROSS REFERENCE TO RELATED APPLICATION

The present invention claims benefit of U.S. Provisional Application No. 63/139,019, filed Jan. 19, 2021, the entire content and disclosure of which is incorporated herein by reference.

FIELD OF THE INVENTION

The present invention relates to a vertical boiling reactor, and more particularly to a shell-and-tube heat exchange reactor having reduced tube pitch.

BACKGROUND

Ethylene oxide (EO) is an important industrial chemical used as a feedstock for making various chemicals, such as, for example, ethylene glycol, ethylene glycol ethers, ethanol amines and detergents. One method for producing EO is by a catalytic oxidation process in which ethylene is reacted with oxygen in the presence of a silver-based epoxidation catalyst. In such a process, a feedstream containing ethylene and oxygen is passed over a bed of the silver-based epoxidation catalyst contained within a reaction zone of an EO reactor that is maintained at certain reaction conditions.

Commercial EO reactors are generally in the form of a shell-and-tube heat exchanger, in which a plurality of substantially parallel elongated, relatively narrow tubes are filled with catalyst particles to form a packed bed, and in which the shell contains a coolant. One such EO reactor is shown in FIG. 1. The EO reactor 1 shown in FIG. 1 includes a plurality of elongated tubes 2 in which an inlet end of each of the elongated tubes 2 is affixed to inlet tube sheet 3 and the outlet end of each of the elongated tubes 2 is affixed to outlet tube sheet 4. An inlet reactor head 5 is provided as is an exit reactor head 6.

EO reactor 1 further includes a shell and tube heat exchanger 7 that is affixed to and is integral with the exit head 6. An opening is provided in the exit head 6 for communication with heat exchanger 7, and the heat exchanger 7 is welded to the exit head 6 around the opening thus forming an integral structure with the reactor. Heat exchanger 7 is provided with tubes 8 which are affixed to tube sheets 9 and 10. Heat exchanger exit head 11 is also provided.

In practice, reaction gases, e.g., ethylene, oxygen and ballast gas are introduced into the EO reactor 1 via line 12 and pass at reaction conditions through tubes 2 which are packed with an appropriate silver-based epoxidation catalyst. Heat of reaction is removed by circulating heat transfer fluids such as water which are introduced via line 13 to the shell side of the EO reactor 1 and removed via line 14.

Reaction gases pass through tubes 2 where production of EO takes place and upon exiting tubes 2 the gases pass to exit head 6 and then to tubes 8 of the heat exchanger 7 and are immediately cooled to prevent further oxidation and isomerization. A cooling fluid, such as, for example, water, is introduced to the shell side heat exchanger 7 via line 15 and removed via line 16. Cooled reaction gases exit heat exchanger 7 via line 17 and are treated in a conventional fashion for recovery of product and recycle of various components.

Fabrication of EO reactors is getting very challenging due to the reactors' increasing size for larger plants, and costs are rising exponentially. One ongoing goal in EO reactor manufacturing is to reduce the size of the EO reactor taking advantage of reduced tube pitch; tube pitch is the shortest center-to-center distance between adjacent (i.e., neighboring) tubes.

Welding of the elongated tubes to the inlet and outlet tube sheets is a critical step in EO reactor fabrication. Current welding configurations and welding materials for tube to tube sheet welding do not circumvent reduced tube pitch inside the EO reactor.

SUMMARY

Reduced tube pitch within a shell-and-tube heat exchange reactor such as, for example, an EO reactor, is provided by utilizing a welding material that has a high tensile (i.e., a tensile strength of greater than 600 MPa). Reduced tube pitch allows for more elongated tubes (the tubes are filled with a catalyst) to be present in a reactor, and thus a smaller reactor can be manufactured. Notably, the use of a high tensile strength welding material allows the implementation of a small welding groove located between a beveled sidewall of a beveled upper portion of an opening provided in a tube sheet overlay material (that is located atop a tube sheet) and an outermost sidewall of the elongated tube passing through the opening in the tube sheet overlay material.

In one aspect of the present invention, a shell-and-tube heat exchange reactor is provided that includes an inlet tube sheet having a plurality of first openings and located at an inlet end of the reactor, an outlet tube sheet having a plurality of second openings and located at an outlet end of the reactor, and a plurality of elongated tubes located between the inlet tube sheet and the outlet tube sheet and passing through the plurality of first and second openings. The reactor also includes a tube sheet overlay material located atop both the inlet tube sheet and the outlet tube sheet. The tube sheet overlay material of the present invention contains a plurality of third openings configured to allow the plurality of elongated tubes to pass there through. Each third opening of the plurality of third openings comprises a beveled upper portion having a welding groove located between a beveled sidewall of the beveled upper portion of the third opening and an outermost sidewall of the elongated tube passing through the third opening. A welding material is located inside the welding groove and is affixed to the outermost sidewall of the elongated tube passing through the third opening. In accordance with the present invention, the welding material that is located inside the welding groove has a tensile strength that is greater than 600 (e.g., 601, 602, 603, etc.) MPa.

In some embodiments, the reactor is an ethylene oxide (EO) reactor that further includes an inlet line for introducing a feed gas comprising 1% to 40% ethylene and 3% to 12% oxygen into the EO reactor, wherein the EO reactor is configured to operate at a gas hourly space velocity of 1500 to 10,000 h$^{-1}$, a rector inlet pressure of 1 MPa to 3 MPa, a coolant temperature of 180° C. to 315° C., an oxygen conversion level of 10-60%, and an EO production rate (work rate) of 100-350 kg EO/m$^3$ catalyst/hr and a change in ethylene oxide concentration, ΔEO, of from about 1.5% to about 4.5%, and wherein each elongated tube is filled with a silver-based epoxidation catalyst comprising an alumina support, a catalytically effective amount of silver or a silver-containing compound, and a promoting amount of one or more promoters.

DETAILED DESCRIPTION

Figure 1:
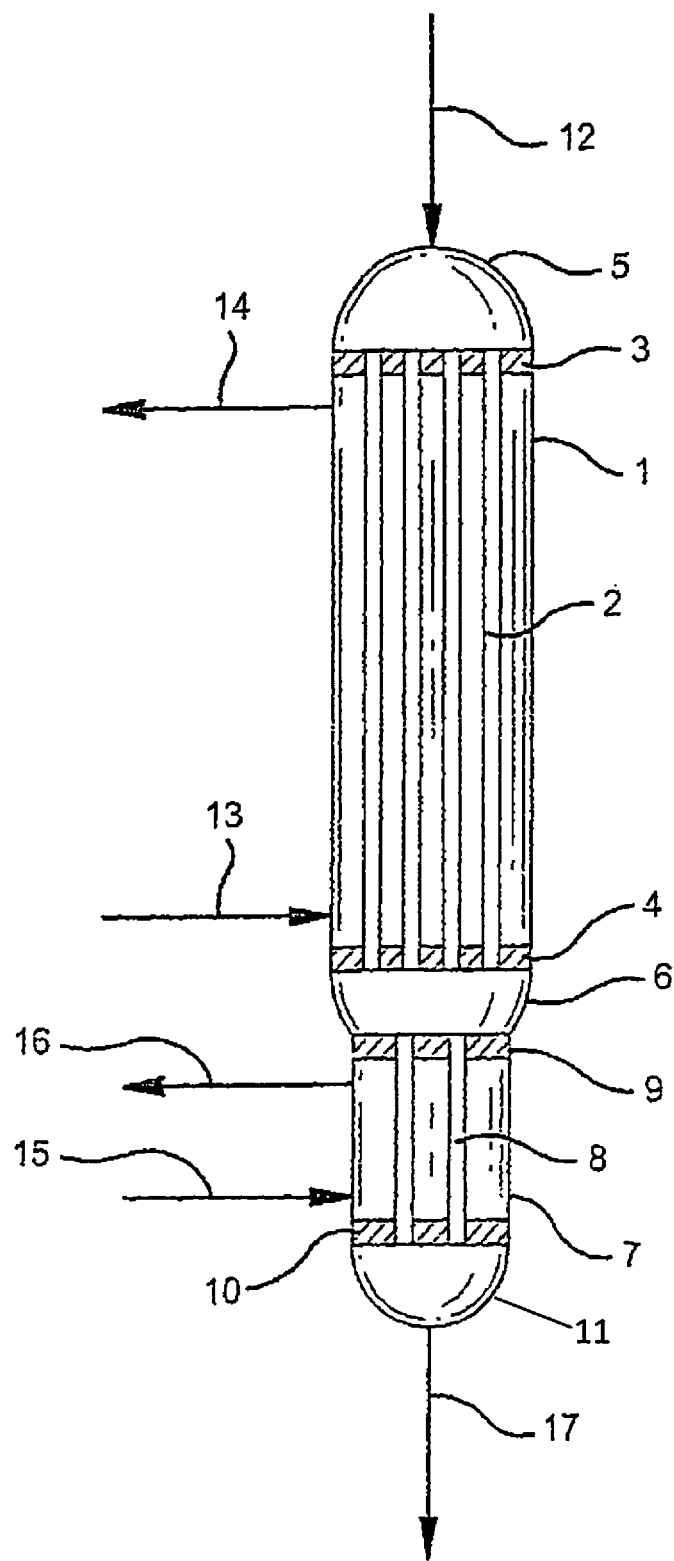
FIG. 1 is schematic representation of a prior art EO reactor.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present. The term "about" when used in conjugation with a numerical value denotes that the numerical value may fluctuate from ±10% from the given numerical value.

As stated previously, reduced tube pitch within a shell-and-tube heat exchange reactor such as, for example, an EO reactor, is provided in the present invention by utilizing a welding material that has a tensile strength that is greater than 600 (e.g., 601, 602, 603, etc.) MPa. Reduced tube pitch allows for more elongated tubes to be present in a reactor, and thus a smaller reactor can be achieved. In some embodiments of the present invention, the pitch between each neighboring elongated tube (i.e., the tube pitch) is from about 27 mm to about 80 mm. In some embodiments, and by using the high tensile strength welding material described in the present invention, a reactor containing 7% to 14% more tubes can be obtained, as compared to an equivalent reactor not including the high tensile strength welding material.

The use of the high tensile strength welding material allows the implementation of a small welding groove located between a beveled sidewall of a beveled upper portion of an opening provided in a tube sheet overlay material and an outermost sidewall of the elongated tube passing through the opening in the tube sheet overlay material; the tube sheet overlay material is formed atop each tube sheet that is present in the reactor. In some embodiments of the present invention, the welding groove has a length from about 1.5 mm to about 4.5 mm, and a total area from about 1.125 mm$^2$ to about 10.125 mm$^2$; in FIG. 2B the welding groove is filled with welding material 26. The reduced welding groove, in turn, provides for a reduced tube pitch (and more tubes) inside the reactor and thus a smaller reactor design can be fabricated.

Figure 2A:
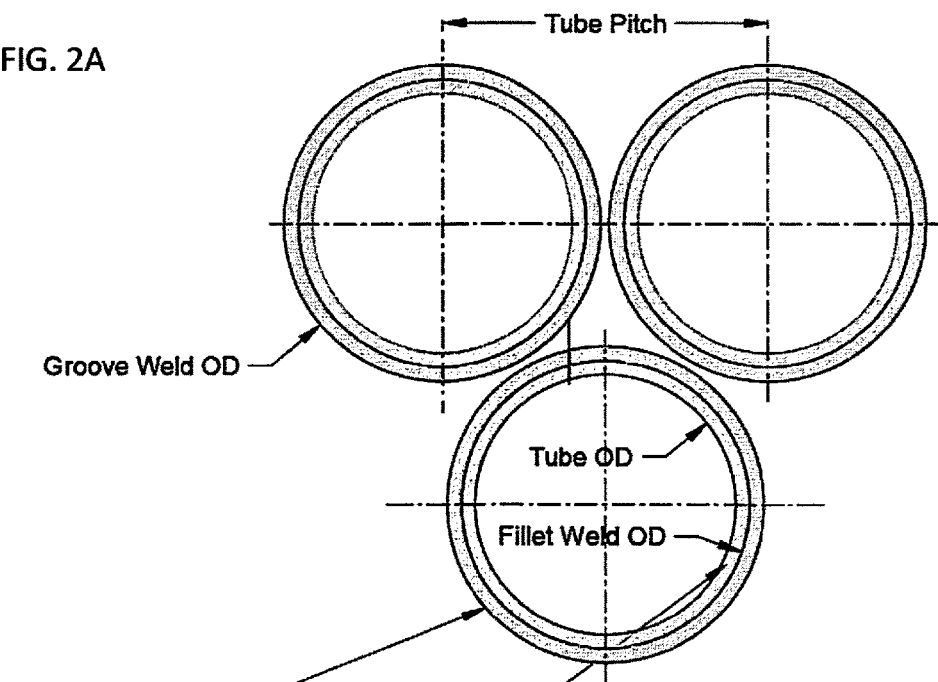
FIG. 2A is a top down view showing the tube pitch for a welding configuration including a high tensile strength groove welding material in a shell-and-tube heat exchange reactor in accordance with the present invention.
Figure 2B:
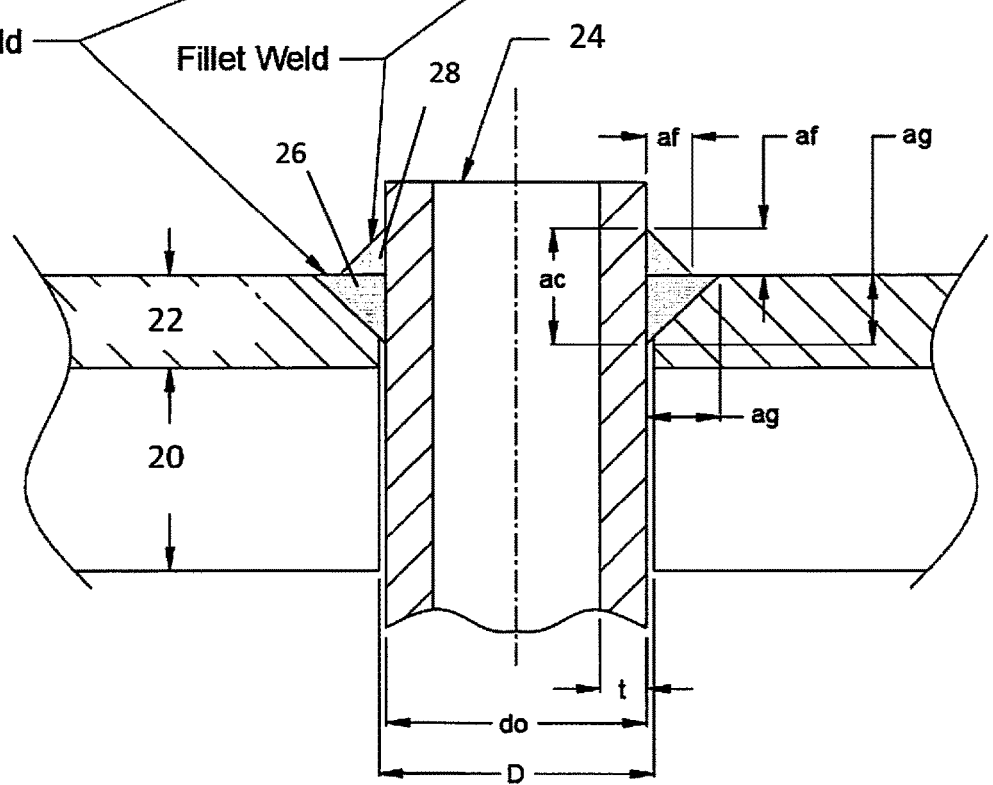
FIG. 2B is a cross sectional view showing the welding configuration including a high tensile strength groove welding material in a shell-and-tube heat exchange reactor in accordance with the present invention.

Notably, a shell-and-tube heat exchange reactor including an EO reactor as shown in FIG. 1 is provided that includes an inlet tube sheet having a plurality of first openings and located at an inlet end of the reactor, an outlet tube sheet having a plurality of second openings and located at an outlet end of the reactor, and a plurality of elongated tubes located between the inlet tube sheet and the outlet tube sheet and passing through the plurality of first and second openings. The inlet tube sheet, the outlet tube sheet and the elongated tubes that are used in the present invention are similar to the inlet tube sheet 3, the outlet tube sheet 4 and the elongated tubes 2 depicted in FIG. 1 above. In FIG. 2B, a tube sheet 20 is shown that can be used as either the inlet tube sheet or the outlet tube sheet of a shell-and-tube heat exchange reactor. For illustrative purposes only, tube sheet 20 shown in FIG. 2B has a single opening in which a single elongated tube 24 passes there through. Although a single opening is shown in tube sheet 20, a plurality of openings can be present in tube sheet 20 in which each opening in the tube sheet is configured to allow a single elongated tube to pass there through. Elongated tubes 24 (similar to elongated tubes 2 shown in FIG. 1) also pass through openings that are present in the inlet tube sheet and the outlet tube sheet (e.g., tube sheet 20 shown in FIG. 2B).

Figure 3A:
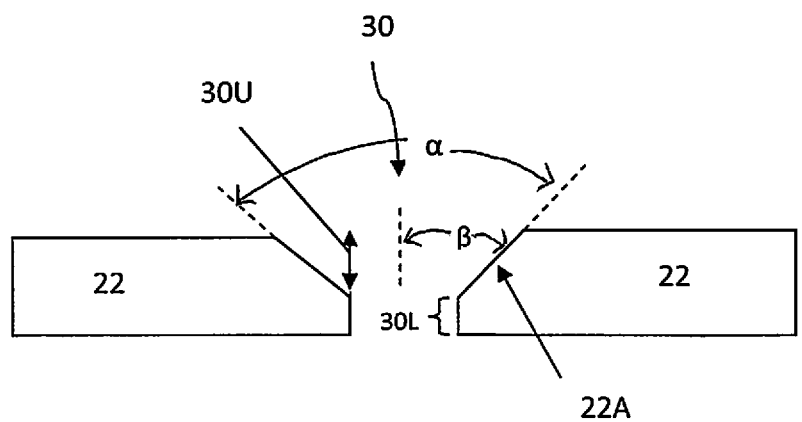
FIG. 3A is a cross sectional view showing a tube sheet overlay material in accordance with an embodiment of the present invention that includes a beveled upper portion that has a V-bevel shape.
Figure 3B:
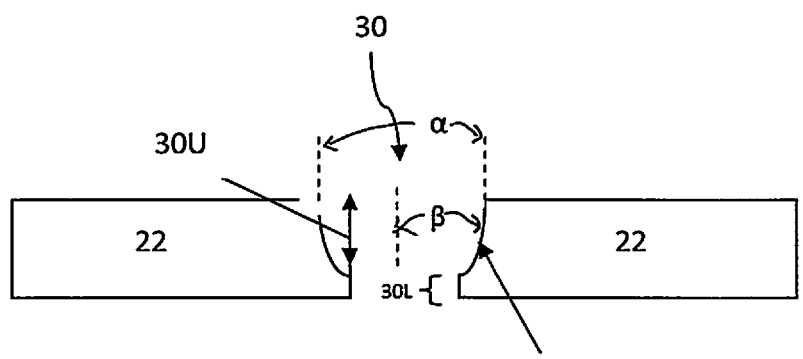
FIG. 3B is a cross sectional view showing a tube sheet overlay material in accordance with an embodiment of the present invention that includes a beveled upper portion that has a J-bevel shape.

As is shown in FIGS. 2B, 3A and 3B, the reactor also includes a tube sheet overlay material 22 located atop both the inlet tube sheet and the outlet tube sheet (e.g., tube sheet 20 shown in FIG. 2B). The tube sheet overlay material 22 of the present invention contains a plurality of third openings 30 configured to allow the plurality of elongated tubes 24 to pass there through. Each third opening 30 of the plurality of third openings comprises a beveled upper portion 30U and a welding groove area (the welding groove is filled with welding material 26 in FIG. 2B) located between a beveled sidewall 22A of the beveled upper portion 30U of the third opening and an outermost sidewall of the elongated tube 24 passing through the third opening; the terms "first opening(s)", "second opening(s)" and "third opening(s)" are used herein solely for identification purposes and for clarity so that one readily knows which of the 'openings' is being discussed. The third opening, i.e., opening 30A, of the tube sheet overlay material 22 further comprises a non-beveled lower portion 30L in communication with the beveled upper portion 30U. In the present invention, the non-beveled lower portion 30L of the opening 30 that is present in the tube sheet overlay material 22 is in communication with the opening present in the tube sheet 20.

A welding material 26 is located inside the welding groove and is affixed to the outermost sidewall of the elongated tube 24 passing through the third opening 30A. In accordance with the present invention, the welding material 26 that is located inside the welding groove has a tensile strength of greater than 600 MPa. Such a high tensile strength welding material has a high allowable stress which permits the use of a small welding groove length ag on the order of about 1.5 mm to about 4.5 mm) and area (on the order of about 1.125 mm$^2$ to about 10.125 mm$^2$) which, in turn, reduces the tube pitch inside the reactor; See FIG. 2A for a top-down view of the welding configuration shown in FIG. 2A. In FIG. 2A, "ag" denotes the length of the welding groove, "af" denotes the length of the fillet weld, "ac" denotes the combined height of the welding groove and the fillet weld, "t" is the thickness of the shell of the elongated tube 24, "$d_o$" is the outer diameter of the elongated tube 24, "D" is the diameter of the opening that is present in the tube sheet 20 (this diameter is typically from about 25.4 mm to 70.4 mm), and element 28 is a fillet welding material that is located on the welding material 26 present in the welding groove. As is shown in FIG. 2B, the fillet welding material 28 also contacts the outermost sidewall of the elongated tube 24. As is further shown in FIG. 2B, the welding groove length, ag, is greater than the fillet weld length. It is noted that since welding material 26 is present in the welding groove, welding material 26 has the same length and area as the welding groove.

Reference is now made to FIGS. 3A and 3B which illustrate different types of openings that can be present in the tube sheet overlay material 22. Notably, FIG. 3A illustrates a tube sheet overlay material 22 that includes a beveled upper portion 30U that has a V-bevel shape; the tube sheet overlay material 22 shown in FIG. 2B also has a V-bevel shape. For the embodiment depicted in FIG. 3A, the beveled upper portion 30U having the V-bevel shape can have a groove angle, α, from about 30° to about 150°, and a bevel angle, β, from about 15° to about 75°. In some preferred embodiments, the beveled upper portion 30U having the V-bevel shape can have a groove angle, α, from about 80° to about 120°, and a bevel angle, β, from about 30° to about 60°.

With respect to FIG. 3B, there is illustrated a tube sheet overlay material 22 that includes a beveled upper portion 30U that has a J-bevel shape. For the embodiment depicted in FIG. 3B, the beveled upper portion 30U having the J-bevel shape can have a groove angle, α, from about 0° to about 60°, and a bevel angle, β, from about 0° to about 30°. In some preferred embodiments, the beveled upper portion 30U having the J-bevel shape can have a groove angle, α, from about 15° to about 45°, and a bevel angle, β, from about 7.5° to about 22.5°.

The tube sheet overlay material 22 that can be used in the present application has a tensile strength that is in the range of the tensile strength of the welding material 26, i.e., greater than about 600 (e.g., 601, 602, 603, etc.) MPa. Typically, the tensile strength of the tube sheet overlay material is from greater than 600 MPa to about 950 MPa, with a tensile strength from about 750 MPa to about 880 MPa being more preferred in some embodiments. Illustrative examples of materials that can be used as the tube sheet overlay material 22 include, but are not limited to, stainless steel.

Each elongated tube 24 that is used in the present invention typically has a tensile strength from about 450 MPa to about 800 MPa. Each elongated tube 24 can have an outer diameter of from 25 mm to about 75 mm.

As stated above, the welding material 26 that is present in the welding groove has a tensile strength of greater than 600 (e.g., 601, 602, 603, etc.) MPa. In some embodiments, the welding material 26 has a tensile strength from greater than 600 MPa to about 950 MPa, with a tensile strength from about 750 MPa to about 880 MPa being more preferred. Illustrative examples, of high tensile strength materials that can be used as welding material 26 include, but are not limited to, a chromium-nickel (Cr—Ni) based alloy.

The fillet welding material 28 can be composed of any welding material including, the high tensile strength welding material mentioned above for welding material 26.

The description that follows provides some details regarding the silver-based epoxidation catalyst that can be present inside an EO reactor which includes the tube sheet overlay material and groove weld material in accordance with the present invention and some details regarding the EO operational conditions used during EO manufacturing. The description below is not meant to be exhaustive but provides a general description of both the silver-based epoxidation catalyst and EO operational conditions that can be used in the present invention.

Typical silver-based epoxidation catalysts include a support, and at least a catalytically effective amount of silver or a silver-containing compound; also optionally present is a promoting amount of rhenium or a rhenium-containing compound; also optionally present is a promoting amount of one or more alkali metals or alkali-metal-containing compounds. The support employed can be selected from a large number of solid, refractory supports that may be porous and may provide the preferred pore structure. Alumina is well known to be useful as a catalyst support for the epoxidation of an olefin and is a preferred support for silver-based epoxidation catalysts.

Regardless of the character of the support used, it is usually shaped into particles, chunks, pieces, pellets, rings, spheres, wagon wheels, cross-partitioned hollow cylinders, and the like, of a size suitable for employment in a fixed-bed epoxidation reactor. The support particles will preferably have equivalent diameters in the range from about 3 mm to about 12 mm, and more preferably in the range from about 5 mm to about 10 mm. (Equivalent diameter is the diameter of a sphere having the same external surface (i.e., neglecting surface within the pores of the particle) to volume ratio as the support particles being employed.) Suitable supports are available from Saint-Gobain Norpro Co., Sud Chemie AG, Noritake Co., CeramTec AG, and Industrie Bitossi S.p.A. Without being limited to the specific compositions and formulations contained therein, further information on support compositions and methods for making supports may be found in U.S. Patent Publication No. 2007/0037991.

In order to produce a catalyst for the oxidation of an olefin to an olefin oxide, a support having the above characteristics is then provided with a catalytically effective amount of silver on its surface. In one embodiment, the catalytic effective amount of silver is from 10% by weight to 45% by weight. The catalyst can be prepared by impregnating the support with a silver compound, complex or salt dissolved in a suitable solvent sufficient to cause deposition of a silver-precursor compound onto the support. Preferably, an aqueous silver solution can be used.

A promoting amount of a rhenium component, which may be a rhenium-containing compound or a rhenium-containing complex may also be deposited on the support, either prior to, coincidentally with, or subsequent to the deposition of the silver. The rhenium promoter may be present in an amount from about 0.001 wt. % to about 1 wt. %, preferably from about 0.005 wt. % to about 0.5 wt. %, and more preferably from about 0.01 wt. % to about 0.1 wt. % based on the weight of the total catalyst including the support, expressed as the rhenium metal.

Other components which may also be deposited on the support either prior to, coincidentally with, or subsequent to the deposition of the silver and rhenium are promoting amounts of an alkali metal or mixtures of two or more alkali metals, as well as optional promoting amounts of a Group IIA alkaline earth metal component or mixtures of two or more Group IIA alkaline earth metal components, and/or a transition metal component or mixtures of two or more transition metal components, all of which may be in the form of metal ions, metal compounds, metal complexes and/or metal salts dissolved in an appropriate solvent. The support may be impregnated at the same time or in separate steps with the various catalyst promoters. The particular combination of support, silver, alkali metal promoter(s), rhenium component, and optional additional promoter(s) of the instant invention will provide an improvement in one or more catalytic properties over the same combination of silver and support and none, or only one of the promoters.

As used herein the term "promoting amount" of a certain component of the catalyst refers to an amount of that component that works effectively to improve the catalytic performance of the catalyst when compared to a catalyst that does not contain that component. The exact concentrations employed, of course, will depend on, among other factors, the desired silver content, the nature of the support, the viscosity of the liquid, and solubility of the particular compound used to deliver the promoter into the impregnating solution. Examples of catalytic properties include, inter alia, operability (resistance to runaway), selectivity, activity, conversion, stability and yield. It is understood by one skilled in the art that one or more of the individual catalytic properties may be enhanced by the "promoting amount" while other catalytic properties may or may not be enhanced or may even be diminished.

Suitable alkali metal promoters may be selected from lithium, sodium, potassium, rubidium, cesium or combinations thereof, with cesium being preferred, and combinations of cesium with other alkali metals being especially preferred. The amount of alkali metal deposited or present on the support is to be a promoting amount. Preferably, the amount ranges from about 10 ppm to about 3000 ppm, more preferably from about 15 ppm to about 2000 ppm, and even more preferably from about 20 ppm to about 1500 ppm, and as especially preferred from about 50 ppm to about 1000 ppm by weight of the total catalyst, measured as the metal.

Suitable alkaline earth metal promoters comprise elements from Group IIA of the Periodic Table of the Elements, which may be beryllium, magnesium, calcium, strontium, and barium or combinations thereof. Suitable transition metal promoters may comprise elements from Groups IVA, VA, VIA, VIIA and VIIIA of the Periodic Table of the Elements, and combinations thereof.

The amount of alkaline earth metal promoter(s) and/or transition metal promoter(s) deposited on the support is a promoting amount. The transition metal promoter may typically be present in an amount from about 0.1 micromoles per gram to about 10 micromoles per gram, preferably from about 0.2 micromoles per gram to about 5 micromoles per gram.

The silver solution used to impregnate the support may also comprise an optional solvent or a complexing/solubilizing agent such as are known in the art. A wide variety of solvents or complexing/solubilizing agents may be employed to solubilize silver to the desired concentration in the impregnating medium. Useful complexing/solubilizing agents include amines, ammonia, oxalic acid, lactic acid and combinations thereof. Amines include an alkylene diamine having from 1 to 5 carbon atoms. In one preferred embodiment, the solution comprises an aqueous solution of silver oxalate and ethylene diamine. The complexing/solubilizing agent may be present in the impregnating solution in an amount from about 0.1 to about 5.0 moles per mole of silver, preferably from about 0.2 to about 4.0 moles, and more preferably from about 0.3 to about 3.0 moles for each mole of silver.

When a solvent is used, it may be an organic solvent or water, and may be polar or substantially or totally non-polar. In general, the solvent should have sufficient solvating power to solubilize the solution components. At the same time, it is preferred that the solvent be chosen to avoid having an undue influence on or interaction with the solvated promoters. Organic-based solvents which have 1 to about 8 carbon atoms per molecule are preferred. Mixtures of several organic solvents or mixtures of organic solvent(s) with water may be used, provided that such mixed solvents function as desired herein.

The concentration of silver in the impregnating solution is typically in the range from about 0.1% by weight up to the maximum solubility afforded by the particular solvent/solubilizing agent combination employed. It is generally very suitable to employ solutions containing from 0.5% to about 45% by weight of silver, with concentrations from 5 to 35% by weight of silver being preferred.

Impregnation of the selected support is achieved using any of the conventional methods; for example, excess solution impregnation, incipient wetness impregnation, spray coating, etc. Typically, the support material is placed in contact with the silver-containing solution until a sufficient amount of the solution is absorbed by the support. Preferably the quantity of the silver-containing solution used to impregnate the porous support is no more than is necessary to fill the pores of the support. A single impregnation or a series of impregnations, with or without intermediate drying, may be used, depending, in part, on the concentration of the silver component in the solution. Impregnation procedures are described, for example, in U.S. Pat. Nos. 4,761,394, 4,766, 105, 4,908,343, 5,057,481, 5,187,140, 5,102,848, 5,011,807, 5,099,041 and 5,407,888. Known prior procedures of pre-deposition, co-deposition and post-deposition of various the promoters can be employed.

After impregnation of the support with the silver-containing compound, i.e., a silver precursor, optional rhenium component, an optional alkali metal component, and the optional other promoters, the impregnated support is calcined for a time sufficient to convert the silver containing compound to an active silver species and to remove the volatile components from the impregnated support to result in a catalyst precursor. The calcination may be accomplished by heating the impregnated support, preferably at a gradual rate, to a temperature in the range from about 200° C. to about 600° C. at a pressure in the range from about 0.5 to about 35 bar. In general, the higher the temperature, the shorter the required heating period. A wide range of heating periods have been suggested in the art; e.g., U.S. Pat. No. 3,563,914 discloses heating for less than 300 seconds, and U.S. Pat. No. 3,702,259 discloses heating from 2 to 8 hours at a temperature of from 100° C. to 375° C., usually for duration of from about 0.5 to about 8 hours. However, it is only important that the heating time be correlated with the temperature such that substantially all of the contained silver is converted to the active silver species. Continuous or step-wise heating may be used for this purpose.

During calcination, the impregnated support may be exposed to a gas atmosphere comprising an inert gas or a mixture of an inert gas with from about 10 ppm to 21% by volume of an oxygen-containing oxidizing component. For purposes of this invention, an inert gas is defined as a gas that does not substantially react with the catalyst or catalyst precursor under the conditions chosen for the calcination. Further information on catalyst manufacture may be found in the aforementioned U.S. Patent Publication No. 2007/0037991.

For purposes of illustration only, the following are conditions that are often used in current commercial EO reactor units: a gas hourly space velocity (GHSV) of 1500-10,000 $h^{-1}$, a reactor inlet pressure of 1 MPa to 3 MPa, a coolant temperature of 180-315° C., an oxygen conversion level of 10-60%, and an EO production rate (work rate) of 100-350 kg EO/m$^3$ catalyst/hr and a change in ethylene oxide concentration, $\Delta$EO, of from about 1.5% to about 4.5%. The feed composition in the reactor inlet after the completion of start-up and during normal operation typically comprises (by volume %) 1-40% ethylene, 3-12% 02; 0.2% to 10%, preferably 0.2% to 6%, more preferably 0.2% to 5% of $CO_2$; 0-5% ethane, an amount of one or more chloride moderators, which are described herein; and the balance of the feed being comprised of argon, methane, nitrogen or mixtures thereof.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A shell-and-tube heat exchange reactor comprising:
   an inlet tube sheet having a plurality of first openings and located at an inlet end of the reactor;
   an outlet tube sheet having a plurality of second openings and located at an outlet end of the reactor;
   a plurality of elongated tubes located between the inlet tube sheet and the outlet tube sheet and passing through the plurality of first and second openings;
   a tube sheet overlay material located atop each of the inlet tube sheet and the outlet tube sheet, wherein the tube sheet overlay material contains a plurality of third openings configured to allow the plurality of elongated tubes to pass there through, each third opening of the plurality third openings comprises a beveled upper portion having a welding groove located between a beveled sidewall of the beveled upper portion of the third opening and an outermost sidewall of the elongated tube passing through the third opening, wherein the beveled upper portion of the third opening of the tube sheet overlay material has a V-bevel shape, a groove angle from about 30° to about 150°, and a bevel angle from about 15° to about 75°; and
   a welding material located inside the welding groove and affixed to the outermost sidewall of the elongated tube passing through the third opening, wherein the welding material located inside the welding groove has a tensile strength of greater than 600 MPa.

2. The shell-and-tube heat exchange reactor of claim 1, wherein the welding groove has a total area from about 1.125 mm$^2$ to about 10.125 mm$^2$, and a length from about 1.5 mm to about 4.5 mm.

3. The shell-and-tube heat exchange reactor of claim 1, wherein the tube sheet overlay material has a tensile strength from greater than 600 MPa to about 950 MPa.

4. The shell-and-tube heat exchange reactor of claim 1, wherein the tensile strength of the welding material located inside the welding groove is from greater than 600 MPa to about 950 MPa.

5. The shell-and-tube heat exchange reactor of claim 1, wherein the welding material located inside the welding groove is composed of a chromium-nickel (Cr—Ni) based alloy.

6. The shell-and-tube heat exchange reactor of claim 1, wherein a pitch between each neighboring elongated tube affixed to the tube sheet overlay material is from about 27 mm to about 80 mm.

7. The shell-and-tube heat exchange reactor of claim 1, wherein the third opening of the tube sheet overlay material further comprises a non-beveled lower portion in communication with the beveled upper portion.

8. The shell-and-tube heat exchange reactor of claim 1, further comprising a fillet welding material located on the welding material present in the welding groove and contacting another portion of the outermost sidewall of the elongated tube.

9. The shell-and-tube heat exchange reactor of claim 1, wherein the shell-and-tube heat exchange reactor is an ethylene oxide (EO) reactor.

10. The shell-and-tube heat exchange reactor of claim 9, wherein the EO reactor further comprises an inlet line for introducing a feed gas comprising 1% to 40% ethylene and 3% to 12% oxygen into the EO reactor.

11. The shell-and-tube heat exchange reactor of claim 10, wherein the EO reactor is configured to operate at a gas hourly space velocity of 1500 to 10,000 $h^{-1}$, a reactor inlet pressure of 1 MPa to 3 MPa, a coolant temperature of 180° C. to 315° C., an oxygen conversion level of 10-60%, and an EO production rate (work rate) of 100-350 kg EO/m$^3$ catalyst/hr and a change in ethylene oxide concentration, $\Delta$EO, of from about 1.5% to about 4.5%.

12. The shell-and-tube heat exchange reactor of claim 9, wherein each elongated tube is filled with a silver-based epoxidation catalyst.

13. The shell-and-tube heat exchange reactor of claim 12, wherein the silver-based epoxidation catalyst comprises an alumina support, a catalytically effective amount of silver or a silver-containing compound, and a promoting amount of one or more promoters.

14. The shell-and-tube heat exchange reactor of claim 13, wherein the one or more promoters comprises at least a rhenium promoter.

15. A shell-and-tube heat exchange reactor comprising:
   an inlet tube sheet having a plurality of first openings and located at an inlet end of the reactor;
   an outlet tube sheet having a plurality of second openings and located at an outlet end of the reactor;
   a plurality of elongated tubes located between the inlet tube sheet and the outlet tube sheet and passing through the plurality of first and second openings;
   a tube sheet overlay material located atop both the inlet tube sheet and the outlet tube sheet, wherein the tube sheet overlay material contains a plurality of third openings configured to allow the plurality of elongated tubes to pass there through, each third opening of the plurality third openings comprises a beveled upper portion having a welding groove having a total area of from about 1.125 mm² to about 10.125 mm² located between a beveled sidewall of the beveled upper portion of the third opening and an outermost sidewall of the elongated tube passing through the third opening, wherein the beveled upper portion of the third opening of the tube sheet overlay material has a V-bevel shape, a groove angle from about 30° to about 150°, and a bevel angle from about 15° to about 75°; and a welding material located inside the welding groove and affixed to the outermost sidewall of the elongated tube passing through the third opening.

16. An ethylene oxide (EO) reactor comprising:

an inlet tube sheet having a plurality of first openings and located at an inlet end of the EO reactor;

an outlet tube sheet having a plurality of second openings and located at an outlet end of the EO reactor;

a plurality of elongated tubes located between the inlet tube sheet and the outlet tube sheet and passing through the plurality of first and second openings;

a tube sheet overlay material located atop both the inlet tube sheet and the outlet tube sheet, wherein the tube sheet overlay material contains a plurality of third openings configured to allow the plurality of elongated tubes to pass there through, each third opening of the plurality third openings comprises a beveled upper portion having a welding groove located between a beveled sidewall of the beveled upper portion of the third opening and an outermost sidewall of the elongated tube passing through the third opening, wherein the beveled upper portion of the third opening of the tube sheet overlay material has a V-bevel shape, a groove angle from about 30° to about 150°, and a bevel angle from about 15° to about 75°;

a welding material located inside the welding groove and affixed to the outermost sidewall of the elongated tube passing through the third opening, wherein the welding material located inside the welding groove has a tensile strength of greater than 600 MPa; and an inlet line for introducing a feed gas comprising 1% to 40% ethylene and 3% to 12% oxygen into the EO reactor, wherein the EO reactor is configured to operate at a gas hourly space velocity of 1500 to 10,000 $h^{-1}$, a reactor inlet pressure of 1 MPa to 3 MPa, a coolant temperature of 180° C. to 315° C., an oxygen conversion level of 10-60%, and an EO production rate (work rate) of 100-350 kg EO/m³ catalyst/hr and a change in ethylene oxide concentration, $\Delta EO$, of from about 1.5% to about 4.5%, and wherein each elongated tube is filled with a silver-based epoxidation catalyst comprising an alumina support, a catalytically effective amount of silver or a silver-containing compound, and a promoting amount of one or more promoters.

17. The EO reactor of claim 16, wherein the welding groove has a total area from about 1.125 mm² to about 10.125 mm², and a length from about 1.5 mm to about 4.5 mm.

18. The EO reactor of claim 16, wherein the tube sheet overlay material has a tensile strength from greater than 600 MPa to about 950 MPa.

19. The EO reactor of claim 16, wherein the tensile strength of the welding material located inside the welding groove is from greater than 600 MPa to about 950 MPa.

20. The EO reactor of claim 16, wherein the welding material located inside the welding groove is composed of a chromium-nickel (Cr—Ni) based alloy.

21. The EO of claim 16, wherein a pitch between each neighboring elongated tube affixed to the tube sheet overlay material is from about 27 mm to about 80 mm.

* * * * *